United States Patent
Abernethy, Jr. et al.

(10) Patent No.: US 7,996,768 B2
(45) Date of Patent: Aug. 9, 2011

(54) OPERATIONS ON DOCUMENT COMPONENTS FILTERED VIA TEXT ATTRIBUTES

(75) Inventors: Michael N. Abernethy, Jr., Pflugerville, TX (US); Srinivasa R. Borusu, Karnataka (IN); Travis M. Grigsby, Austin, TX (US); Lakshmi Potluri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 11/383,970

(22) Filed: May 18, 2006

(65) Prior Publication Data

US 2007/0271509 A1    Nov. 22, 2007

(51) Int. Cl.
*G06F 17/21* (2006.01)

(52) U.S. Cl. ........ 715/257; 715/243; 715/250; 715/255; 715/269; 715/270

(58) Field of Classification Search .................. 715/257, 715/243, 249, 250, 253, 255, 269, 270
See application file for complete search history.

(56) References Cited

U.S. PATENT DOCUMENTS

| | | | |
|---|---|---|---|
| 5,604,897 A | | 2/1997 | Travis |
| 5,649,222 A | | 7/1997 | Mogilevsky |
| 5,787,451 A | | 7/1998 | Mogilevsky |
| 5,857,198 A | * | 1/1999 | Schmidt .................... 707/103 R |
| 5,859,636 A | * | 1/1999 | Pandit ........................... 715/204 |
| 6,044,387 A | * | 3/2000 | Angiulo et al. ............... 715/257 |
| 6,279,016 B1 | * | 8/2001 | De Vorchik et al. .......... 715/210 |
| 6,411,974 B1 | * | 6/2002 | Graham et al. ............... 715/202 |
| 6,694,326 B2 | * | 2/2004 | Mayhew et al. ............... 707/754 |
| 6,782,510 B1 | | 8/2004 | Gross et al. |
| 6,816,884 B1 | * | 11/2004 | Summers ...................... 709/206 |
| 7,178,102 B1 | * | 2/2007 | Jones et al. ................... 715/235 |
| 7,334,185 B2 | * | 2/2008 | Wicks .......................... 715/204 |
| 2002/0095448 A1 | | 7/2002 | Selby |
| 2002/0120604 A1 | * | 8/2002 | Labarge et al. .................. 707/1 |
| 2003/0103082 A1 | | 6/2003 | Carroll |
| 2003/0229848 A1 | * | 12/2003 | Arend et al. ................... 715/509 |
| 2004/0002994 A1 | * | 1/2004 | Brill et al. .................. 707/104.1 |
| 2004/0032432 A1 | * | 2/2004 | Baynger ....................... 345/810 |
| 2004/0049732 A1 | * | 3/2004 | Wicks .......................... 715/509 |
| 2004/0107089 A1 | * | 6/2004 | Gross et al. ..................... 704/10 |
| 2004/0205674 A1 | * | 10/2004 | Delgado et al. ............... 715/536 |

(Continued)

OTHER PUBLICATIONS

Bill Camarda, Using Microsoft® Word 97, 1997, QUE.*

(Continued)

*Primary Examiner* — Stephen S Hong
*Assistant Examiner* — I-Chan Yang
(74) *Attorney, Agent, or Firm* — Stephen J. Walder, Jr.; Libby Z. Toub

(57) ABSTRACT

Methods, apparatuses, systems, and media to perform operations on filtered components of documents are disclosed. Embodiments comprise a method of performing an operation on selected components of an electronic document using at least one criterion to filter selected parts from other parts of the electronic document. In some embodiments, the method includes analyzing the electronic document to generate the filtering criteria. One embodiment includes presenting a list of filtering criteria to a user, whereupon the user may choose one or more criteria. Other variations of embodiments generally include apparatuses, systems and media that allow a user to choose specific text fonts, text styles, text entry dates, and text entry authors as filtering criteria, for such operations as spell checking, grammar checking, printing, and copying the document components, or text.

20 Claims, 7 Drawing Sheets

U.S. PATENT DOCUMENTS

2004/0221062 A1* 11/2004 Starbuck et al. .............. 709/246
2005/0108748 A1* 5/2005 Nishikawa et al. ............ 725/38
2005/0262443 A1 11/2005 Sindambiwe et al.
2005/0283726 A1* 12/2005 Lunati ........................... 715/533
2007/0203707 A1* 8/2007 Carus et al. ................... 704/270
2008/0052619 A1* 2/2008 Illg ................................ 715/257

OTHER PUBLICATIONS

Bill Camarda, Special Edition Using® Microsoft® Office Word 2003, Dec. 12, 2003, QUE.*

Microsoft Corporation, Microsoft Office Word 2003, copyrighted 1983-2003, program functionalities illustrated in Screen 1~6 captured by the examiner in Aug.-Sep. 2010.*

* cited by examiner

OPERATIONS ON DOCUMENT COMPONENTS FILTERED VIA TEXT ATTRIBUTES

FIELD

The present invention generally relates to the fields of electronic documents, Graphical User Interfaces (GUIs), Applications Programming Interfaces (APIs), subroutines, algorithms, document editing applications, and rules engines. More particularly, the present invention relates to methods, apparatuses, and computer program products for performing operations on selective components of electronic documents based on one or more component attributes.

BACKGROUND

As personal computers (PCs), handheld PCs, and other electronic devices running applications have become more sophisticated over the years, the utilities and features available in these applications have also become more sophisticated. These applications, utilities, and features allow a user to interact with the electronic devices by inputting commands, inputting data, and receiving results from the applications and devices, usually through user interfaces. Among the various interfaces available, Graphical User Interfaces (GUIs) and Application Programming Interfaces (APIs) have become very popular for interacting with these electronic devices, as well as viewing and modifying documents contained in the electronic devices.

An example utility common among many applications today, which may be implemented in a GUI or through an API, is a spell checking routine. While spell checking routines historically only appeared in programs such as word processors, such routines are now found in e-mail applications, spreadsheet applications, database applications, Hyper Text Markup Language (HTML) editors, and internet browsers. Spell checking routines, as well as other routines and application features, have matured considerably in the past decade. For example, current spell checking utilities usually suggest multiple spellings for unrecognized words and usually provide support for multiple languages.

Even though these utilities and application routines have matured and are certainly useful, they still lack many benefits when evaluated in terms of user efficiency. Current incarnations of these utilities often require significant wasted effort on the part of a user. Most of the utilities, or functions, in applications often require the user to work with an entire document. However, often times the user may only want to work with a small portion of the document. The amount of time spent working with the remaining portion of the document, instead of only the small portion on which the user desires to work, is wasted time. An example will help explain this efficiency loss.

A person may receive a very long e-mail message containing both information and questions, to which the recipient may need to respond. Instead of typing a standard conversational reply, the recipient may choose to respond to the questions of the e-mail message by typing answers and comments directly below the questions. To call attention to the answers and comments entered into the e-mail message reply, the recipient may format the text of the answers and the comments. For example, the recipient may choose another color for the text or make the text a larger font. Before sending the e-mail to the sender, the recipient may wish to check the spelling of the answers and comments. The recipient may find one spelling error in the answers and comments but find thirty-six errors in the original e-mail message. While the time needed to correct the single error may take five or six seconds, the time needed to choose to ignore the thirty-six errors may take one or two minutes.

Presently, there are no effective and efficient solutions to eliminate this wasted effort. Some users may select individual portions of text, by using a mouse, and spell check the individual portions. However, this method is tedious and cumbersome, especially for lengthy documents. There is therefore a need in the art for more efficient and user-friendly methods, apparatuses, and systems for selective component verification of documents.

SUMMARY

The problems identified above are in large part addressed by methods, apparatuses, systems, and media to perform operations on filtered components of documents. One embodiment comprises a method of performing an operation on selected parts of an electronic document. At least one criterion is used to filter selected parts from other parts of the electronic document, whereupon one or more operations are performed on the selected parts. One variation of the method includes analyzing or scanning the electronic document to generate the filtering criteria. Another variation includes presenting a list of filtering criteria to a user, whereupon the user may choose one or more criteria to filter the selected parts in the electronic document. Other variations of the method generally include choosing specific text fonts, text styles, text entry dates, and text entry authors as the filtering criteria, for such operations as spell checking, grammar checking, printing, and copying the document components, or text.

Other embodiments comprise an apparatus to select elements in a document for an operation, comprising a rule selector, a comparator, and an operation module. Variations of the apparatus may permit the user to pick one or more rules to be used by the comparator. The rule selector may comprise a textual or graphical interface.

A further embodiment comprises a machine-accessible medium containing instructions, which when executed by a machine cause the machine to perform a word processing operation in response to presenting a list of document parameters to a user, choosing at least one of the parameters by the user, and performing the word processing operation on components of the document selected in response to the chosen parameters.

BRIEF DESCRIPTION OF THE DRAWINGS

Aspects of the invention will become apparent upon reading the following detailed description and upon reference to the accompanying drawings in which, like references may indicate similar elements.

DETAILED DESCRIPTION OF EMBODIMENTS

Figure 1:
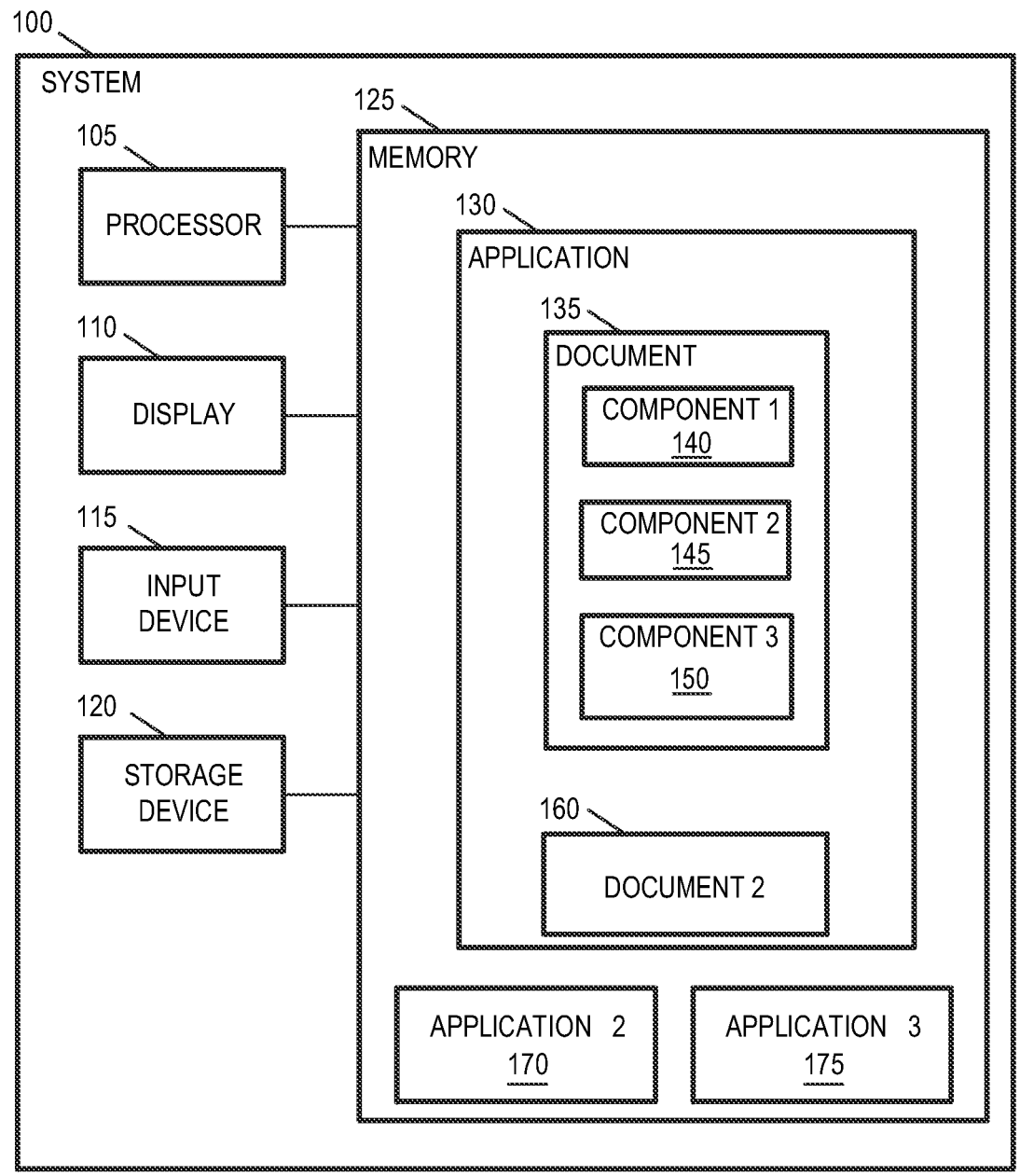
FIG. 1 depicts a system executing several applications in memory, with one application having two documents.

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods, apparatuses, and systems for performing operations on selective components, such as characters, of documents are disclosed. Embodiments comprise GUI screens and application interfaces which may be configured to display and program a variety of different component selection parameters that may be used to filter unwanted components, such as previously entered sections of text, and perform operations on the remaining content. In some embodiments, a user may pick component selection parameters from a drop-down menu. In other embodiments, the user may pick the parameters from pop-up windows. In even further embodiments, the user may pick the parameters after pressing a key combination. In some embodiments, a user may perform one or more operations on selected components, or portions, of a document based on text formatting. In other embodiments, the user may perform operations on certain portions of the document, such as text portions, based on which user or users entered the portions.

Different embodiments may perform different operations on selected components. For example, some embodiments may allow a person to check the spelling of certain portions of text in an e-mail. Other embodiments may allow a person to print selected, or filtered, sections from a word processing document. Aside from the types of operations that may be performed, embodiments may be implemented in countless consumer electronic devices such as desktop and laptop computers, mainframe computing systems, and numerous portable computing devices such as personal digital assistants (PDAs) and mobile telephones.

While portions of the following detailed discussion describe many embodiments for selecting text within electronic documents and checking the text spelling, upon review of the teachings herein, a person of ordinary skill in the art will appreciate that different components of documents and files may be selected and altered using numerous variations of the methods discussed. For example, one may select certain numerical formulas in a spreadsheet and perform one or more different operations, such as change the format of the numbers. One of ordinary skill in the art will recognize that such variations may be substituted for these described methods and employed in accordance with similar constraints to perform substantially equivalent functions.

Turning to the drawings, FIG. 1 illustrates a system 100 which may comprise several different embodiments for verifying, performing operations on, and modifying selective components of documents. For example, system 100 may allow a user to check the grammar of selected components, such as portions of text, in a word processing document based upon parameters that the user chooses. System 100 may exist in a variety of different forms, such as a desktop or a laptop computer. In other embodiments, system 100 may comprise a wireless personal digital assistant (PDA) or other similar palm-held personal computing device.

System 100 may have a processor 105 capable of executing program instructions for different types of applications, such as application 130, application 170, and application 175, that may be in memory 125. For example, application 130 may be a word processing application capable of editing numerous documents simultaneously. As depicted in FIG. 1, application 130 may have two documents open, such as document 135 and document 160. Each document may have multiple components. As depicted in FIG. 1, document 135 may have a first component 140, a second component 145, and a third component 150. A component may be any section of a document on which an application may perform operations. Components may include one or more of a section of text (e.g., word, phrase, sentence, paragraph, document section, etc.), a region of a document (e.g., header, footer, signature block, table of contents, etc.), text with one or more character attributes (e.g., italicized, bolded, a particular font or text size, highlighted text, etc.), non-text objects (e.g., imported objects, spreadsheet cells, image files, etc.), or other portions of a document. Each component may be a paragraph, a sentence, or a page of text in document 135, as examples. Each component may also include control-characters used to format the text, such as characters representing "new line", "bold", text "color", "center alignment", "new paragraph", etc.

System 100 may display documents 135 and 160 on a display 110. Display 110 may allow the user to read documents 135 and 160 as well as edit them. The user may edit documents 135 and 160 using input device 115. For example, input device 115 may comprise a keyboard. In other embodiments input device 115 may comprise a mouse. In alternative embodiments input device 115 may comprise a keyboard and mouse combination, such as laptop keyboard with an integrated joystick mouse. In further embodiments input device 115 may comprise a tablet and stylus, such as a pressure-sensitive surface in a PDA that recognizes hand-written characters. In even further embodiments input device 115 may comprise an audible input device, such as a microphone used for speech recognition.

System 100 may store documents 135 and 160 in a storage device 120. For example storage device 120 may comprise a parallel or serial ATA hard drive. Storage device 120 may also comprise an optical storage device, such as a rewritable compact disc (CD) or digital versatile disc (DVD) drive. In other embodiments, storage device 120 may comprise a flash memory device, such as a universal serial bus (USB) thumb drive. In addition to storing documents 135 and 160, storage device 120 may also store applications 130, 170, and 175. System 100 may also use storage device 120 in conjunction with memory 125, temporarily buffering portions of application 130, application 170, application 175, document 135, and document 160 in storage device 120 that cannot entirely fit in memory 125. For example, while spell checking a portion of document 135, system 100 may need to store a portion of application 130 or document 135 in storage device 120 because of insufficient memory 125.

While using system 100, the user may start application 130, which may be a word processing application, and open document 135. Components 140 and 145 may have existed in document 135 before the user opened it. The user may also add component 150. Before closing or saving document 135, the user may wish to check the grammar of component 150. To do so, the user may invoke a grammar checking routine using input device 115. In executing the routine, the user may first choose one or more parameters, or rules, as inputs for the grammar checking routine that cause it only to check certain sections of document 135. Continuing with our example, since the user only wants to check the spelling of component 150, the user may choose one or more parameters relating to the date that component 150 is added to the document. Since components 140 and 145 were added at an earlier date, the grammar checking routine may ignore the grammar of them and only check the grammar of component 150, which will have an entry date matching date the parameters selected by the user.

Similar to the manner in which the user added component 150 to document 135, the user may also have added components to document 160. In some embodiments, the grammar checking routine may be configured to check the grammar of selective components in document 160 based upon the parameters. In other words, some embodiments may employ an algorithm or rules engine capable of checking multiple documents within an application in response to a single set of selected parameters. Additionally, some embodiments may employ routines or algorithms that may verify the components of documents in multiple applications. For example, processor 105 may execute a separate routine in memory 125 of system 100 that verifies and modifies selective components in documents of applications 170 and 175, in addition to documents 135 and 160 of application 130, based on a single selection of component selection parameters.

As discussed in the preceding example, application 130 of system 100 may be a word processing application used to verify and perform operations on selected components of a word processing document, document 135. In an alternative embodiment, application 130 may instead be a spreadsheet application, with components 140, 145, and 150 being text or formulas in cells and groups of cells. In another embodiment, application 130 may be a database program with components 140, 145, and 150 being database records. In an even further embodiment, application 130 may comprise an HTML editor editing textual and or graphical components of a web page or HTML documents.

Additionally, while the preceding example discussed a system 100 employing local memory 125 and local storage device 120, alternative embodiments may comprise a system 100 executing or accessing programs and documents in remote locations. For example, application 130 may actually comprise two programs, one on a local client system and another on a remote server system. The local client program may be a web browser running a Java application for a web page. The web page may have been downloaded from a web server on the remote server system. The user may use application 130 to insert components 140, 145, and 150 into document 135, which may be stored remotely on the remote server system. As a person skilled in the art will quickly appreciate, system 100 may include numerous communication and networking modules with almost unlimited combinations of local and remote memory and storage devices.

Figure 2A:
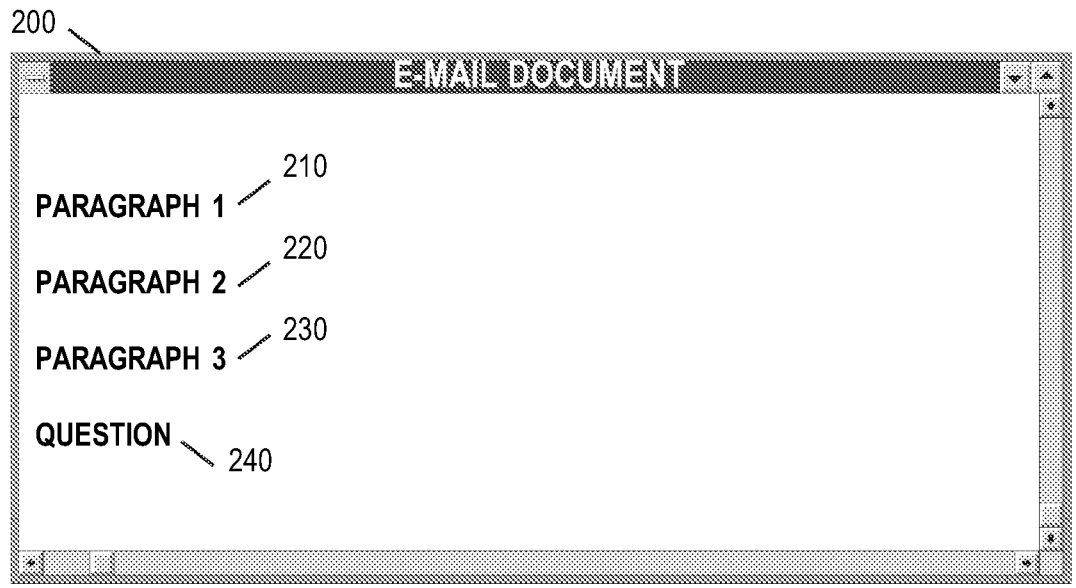
FIGS. 2A-2B depict an e-mail document with paragraphs and a question, as well as an e-mail reply containing comments and an answer, in a GUI window format.

In allowing the user to view, modify, and save documents, system 100 may employ a graphical window system comprising menu elements and submenu elements within numerous windows shown on display 110. To further illustrate how the user may add components to documents, such as adding component 150 to document 135, we turn now to FIGS. 2A and 2B. FIG. 2A illustrates a number of graphical user interface elements on a GUI screen 200. GUI screen 200 may be displayed on a variety of electronic devices. For example, GUI screen 200 may be shown on a display screen, like display 110 of system 100 in FIG. 1, which may be an LCD screen of a PDA or laptop computer, or a CRT screen of a desktop computer. GUI screen 200 may have one or more document elements, or sections, such as paragraph 210, paragraph 220, paragraph 230, and question 240.

Paragraphs 210, 220, 230, and question 240 may comprise characters of an e-mail document sent from a sender to a recipient. For the sake of illustration, suppose that the sender sent the e-mail shown on GUI screen 200 to the recipient to convey information to the recipient as well as request information from the recipient. For example paragraphs 210, 220, and 230 may comprise statements summarizing meeting minutes for a meeting that both the sender and recipient attended. In the context of those paragraphs, the sender may desire a response from the recipient, evident from question 240.

In responding to the e-mail, the recipient could create an entirely new e-mail document. Alternatively, the recipient may choose a "Reply" feature of the e-mail program which may copy and resend the components, including the text, of the original e-mail document. Responding in this manner may allow the recipient to enter comments, responses, and answers immediately near the corresponding paragraphs of the original e-mail document in order to provide context.

Figure 2B:
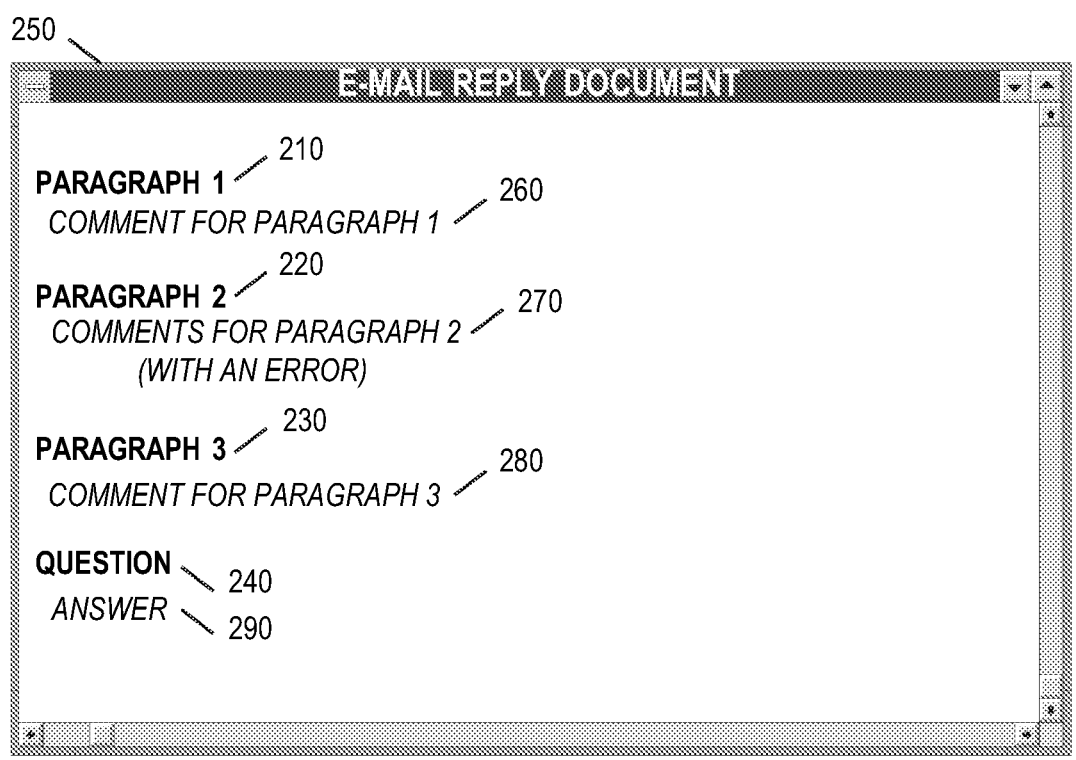

An example e-mail reply document is shown in FIG. 2B. Similar to the original e-mail document shown on GUI screen 200, GUI screen 250 shows a window containing the e-mail reply document containing both the original text entered by the sender and the reply text inserted by the recipient. More specifically, GUI screen 250 shows the addition of comments 260, 270, 280, and answer 290 corresponding to paragraphs 210, 220, 230, and question 240 shown in FIG. 2A. Two items of importance are worth emphasizing. First, one should note how each of the comments are placed immediately next to each corresponding paragraphs. Second, one should also note that each of the items in the original e-mail document (paragraphs 210, 220, 230, and question 240) and the new comments in the reply e-mail document (comments 260, 270, 280, and answer 290) are all separate components. As mentioned above, a component may be any section of a document on which an application may perform operations and on which a user may desire to selectively perform one or more operations.

To differentiate the reply text component from the original text component, the recipient may format the reply text differently than the original text by formatting the text using different text attributes. As shown in GUI screen 200 of FIG. 2A, the original text formatting for paragraphs 210, 220, 230, and question 240 may have a bold "Times New Roman" font. In the e-mail reply document of GUI screen 250, the formatting of the reply text characters, or character attributes, for comments 260, 270, 280, and answer 290 may have an italicized and un-bolded "Courier" font.

Before sending the e-mail reply document to the sender, the recipient may desire to check the spelling of the reply text characters. Instead of wasting time and checking or verifying the content, or components, of the entire e-mail reply document, the recipient may use an embodiment to check only text characters associated with the reply text. In other words, the recipient may utilize an embodiment to check the spelling of comments 260, 270, 280, and answer 290 while ignoring any spelling errors in paragraphs 210, 220, 230, and question 240.

To filter, or separate, the original text from the reply text, the recipient may choose a set of text selection parameters that are sent to a program algorithm or routine, wherein the algorithm skips or ignores the original text and verifies only the reply text. For example, the recipient may choose a text parameter of "Italic" and send the parameter to the filtering algorithm, such that the filtering algorithm only selects italic text. The filtering algorithm may work in conjunction with another algorithm that checks the spelling of the italic text. For example, in FIG. 2B the recipient may request the spell checking routine to check only the reply text, which has italic formatting, by instructing the spell checking routine to only check text that has italic formatting. Consequently, the spell checking routine may start progressing through text in the e-mail reply document in FIG. 2B. The routine may ignore the first section of text in paragraph 210, since it has no italic text. Upon reaching comment 260, however, the routine may recognize that comment 260 has italic formatting and start checking the text of comment 260 for spelling errors. Comment 260 may contain no spelling errors. As a result, the spell checking routine may not alter the text but merely verify that the words are spelt correctly.

Upon verifying the spelling of the words in comment 260, the routine may then start analyzing the text of paragraph 220. Since the text of paragraph 220 is not formatted with italic text, the routine may skip it and not check its spelling. After skipping paragraph 220, the routine may then start analyzing comments 270. Since comments 270 have text formatted in italics, the routine may again start checking the text of comment 270 for spelling errors. Unlike the text in comment 260, which had no spelling errors, text in comment 270 may contain a spelling error. The routine may detect the spelling error, display the error to the user, and prompt the user with a list of suggested words. The user may correct or ignore the error, after which the routine may continue checking the rest of the text in comment 270. This sequence of checking italic text for spelling errors and ignoring all other text may continue until the routine has reached the end of the document. For example, the routine may check the text of comment 280 and answer 290 while ignoring text of paragraph 230 and question 240.

Figure 3A:
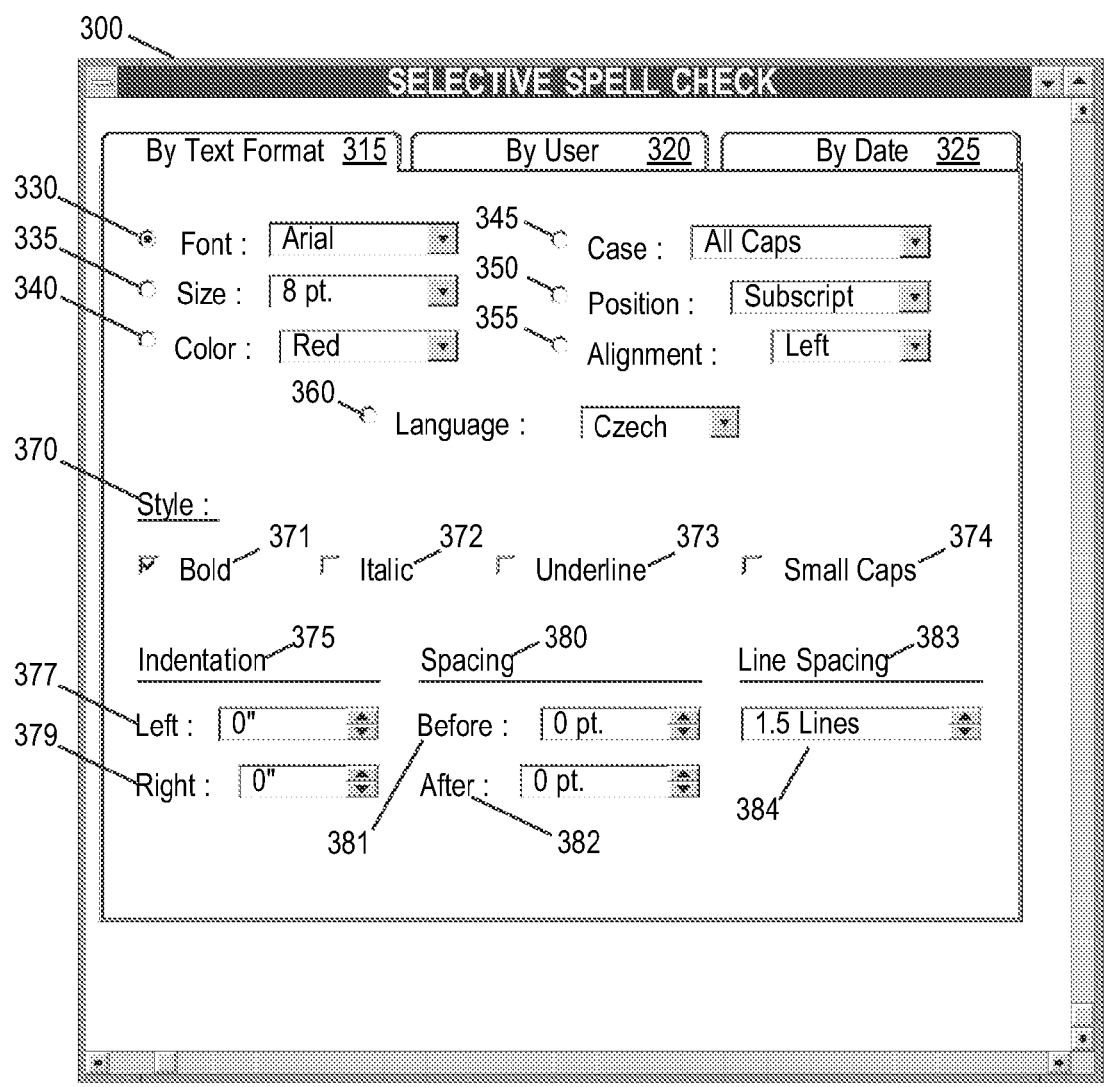
FIG. 3A depicts an embodiment of a GUI screen for a selective spell checking routine, allowing a user to choose the type of text to be checked for spelling errors.

To illustrate a selective spell checking user interface screen for an embodiment, we turn now to FIG. 3A. FIG. 3A shows a window 300 having tabbed pages 315, 320, and 325 which may comprise a user interface used to communicate character attributes to a user. Window 300 may allow the user to choose a set of parameters, criteria, or character and text attributes, which may be fed to a rules engine in order to verify certain sections of content in an electronic document. Upon selecting the "By Text Format" tabbed page 315, the user may select a variety of text attributes that may be received and used by the rules engine to filter out text not meeting the text attributes and verify only text matching the attributes. For example, the user may select different choices in the drop-down boxes corresponding to radio buttons 330, 335, and 340, which correspond to parameters for text font, text size, and text color, respectively. Possible choices for the drop-down boxes corresponding to radio buttons 330, 335, and 340 may be "Courier", "Times New Roman", "12 pt.", "14 pt.", "Blue", and "Black", to name only a few. Such parameter choices for the drop-down boxes may be obtained, or generated, after an algorithm analyzes components in a document on which the user is working.

The user may choose additional text and/or character attributes on the "By Text Format" tabbed page 315, such as text case radio button 345, text position radio button 350, text alignment radio button 355, and language radio button 360. Possible alternative choices for the drop-down box corresponding to text case radio button 345 may be "All Caps", "Initial Caps", "Normal", "Title case", "Uppercase", and "Lowercase". Possible alternative choices for the drop-down box corresponding to text position radio button 350 may be "Normal" and "Superscript". Similarly, choices for the drop-down box corresponding to text alignment radio button 355 may be "Left", "Center", "Right", "Top", "Bottom", and "Middle", referring to possible text justifications. Possible alternative choices for the drop-down box corresponding to the language radio button 360 may be "Danish", "English", "French", "German", "Italian", "Russian", and "Spanish", to name just a few.

The "By Text Format" tabbed page 315 may also have a section 370 where the user can select parameters for the style of text formatting. More specifically, tabbed page 315 may have a "Bold" checkbox 371, an "Italic" checkbox 372, an "Underline" checkbox 373, and a "Small Caps" checkbox 374. While the user may select only one of the style checkboxes in section 370, such as the "Bold" checkbox 371 shown in FIG. 3A, the user may also select two, three, all, or none of the checkboxes. With the "Bold" checkbox 371 chosen, the rules engine may only indicate a match when portions of text in the document have bold formatting. Similarly, if the user had selected both the "Bold" checkbox 371 and the "Italic" checkbox 372, the rules engine may then only indicate a match when portions of text in the document have a bold italic formatted text.

The "By Text Format" tabbed page 315 may also have a section 375 to choose parameters related to text indentation, a section 380 to choose parameters related to text spacing, and a section 383 to choose parameters related to line spacing. In the indentation section 375, the user may use a scroll feature to choose text indentation parameters for left text indentation 377 and right text indentation 379. For example, the user may only want to invoke the rules engine for text that is indented 2 inches from the left-hand margin of the document. Similarly, the user may use a scroll feature to choose text spacing parameters for point spacing before (element 381) and point spacing after (element 382). Likewise, the user may choose parameters relating to line spacing of text with a drop-down or scrolling box 384. For example, the user may desire to check the spelling of all text that is double-spaced.

Figure 3B:
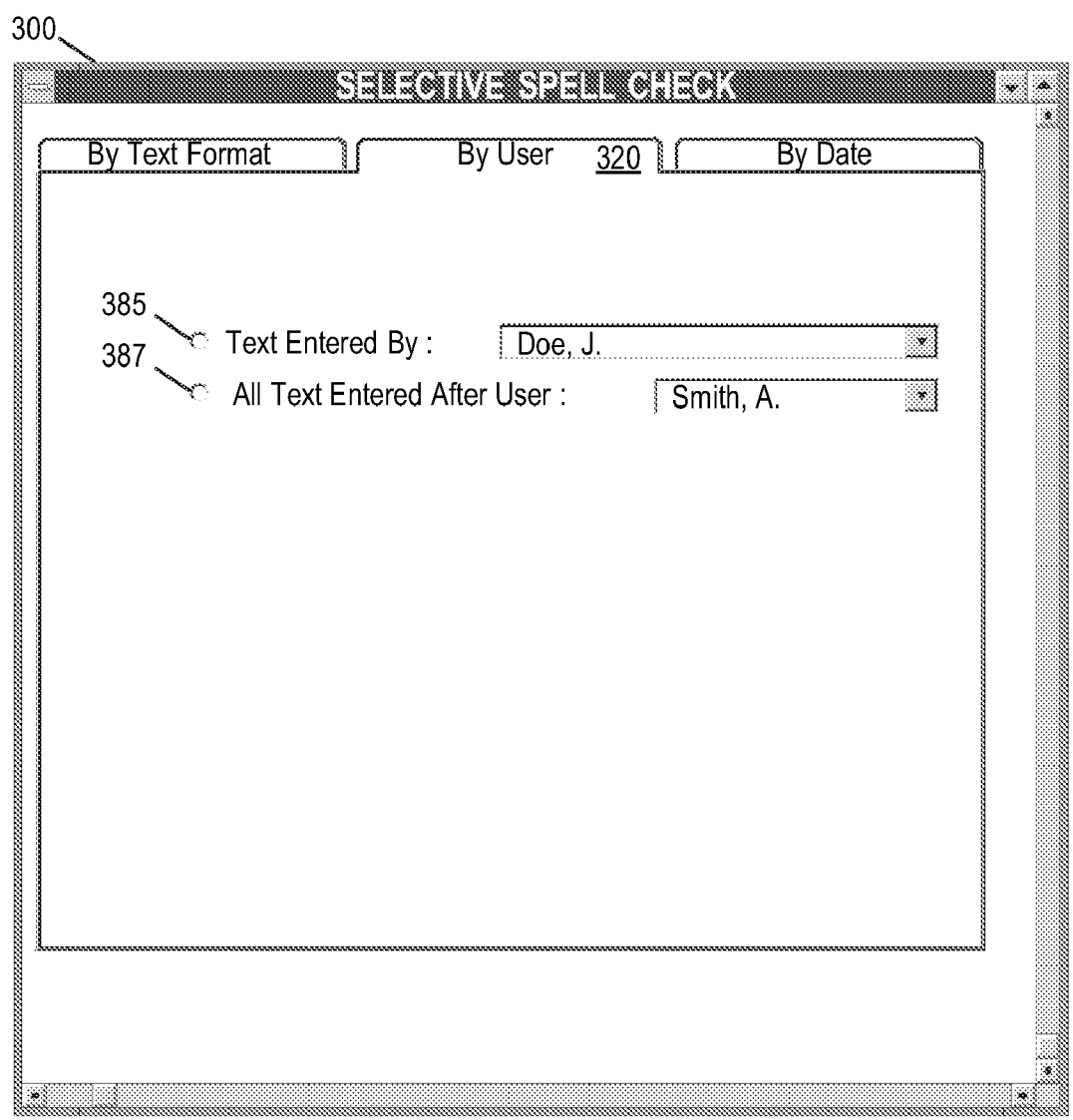
FIG. 3B depicts an embodiment of a GUI screen for the selective spell checking routine of FIG. 3A, allowing the user to check the spelling of specific user text.

Moving now to FIG. 3B, we see how a user may choose rules engine component characteristics to filter components related to different users, such as which users entered which text on which dates. Window 300 in FIG. 3B illustrates what a user may see after clicking the "By User" tabbed page 320 of FIG. 3A. As depicted, FIG. 3B shows that tabbed page 320 may have two radio buttons 385 and 387. The user may use a mouse to choose radio button 385, whereupon the user may then choose one or more users, or document authors, from a list of users that have edited the document. For example, assume that the user is editing a word processing document shared by hundreds of people in one or more offices. Assume further that the word processing application used to edit the document saves information pertaining to changes made by individual users. In other words, the application may associate separate users with each of their changes, enabling a person to see which users make which changes. As mentioned, the user may select the name of the one or more users that have edited the document. For example, individual users may select their names as well as the names of other users in their workgroup who have edited the document. In doing so, the users could trigger spelling and grammar checking only for text or other content entered by them and their workgroup.

In addition to tracking and associating specific changes with specific users, the word processing application may also track the dates and times that the specific users made the changes. For embodiments of programs that track such information, the user may choose radio button 387 and select the name of a prior editor of the document. In doing so, the user may be able to verify the content of all changes made to the document by a particular user.

Figure 3C:
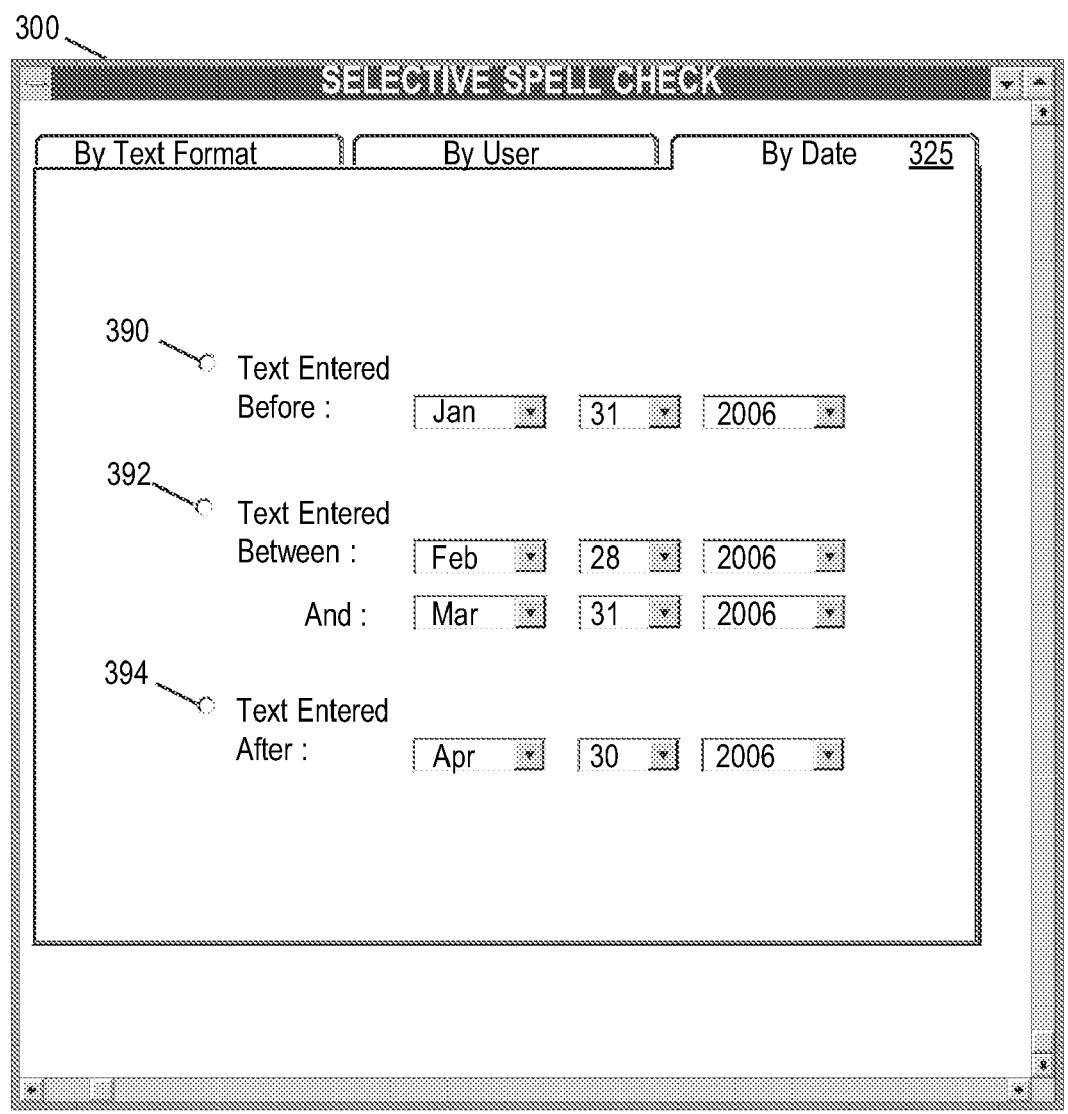
FIG. 3C depicts an embodiment of a GUI screen for the selective spell checking routine of FIG. 3A, allowing the user to check the spelling of dated text entry.

FIG. 3C shows what a user may see after clicking the "By Date" tabbed page 325 of window 300. In particular, FIG. 3C shows that tabbed page 325 may contain three radio buttons 390, 392, and 394. Choosing radio button 390 or radio button 394, along with date parameters in the corresponding drop-down boxes, may allow the user to check the spelling of text content entered before or after a certain date. Alternatively, choosing radio button 392, along with date parameters in the corresponding drop-down boxes, may allow the user to spell check text that was entered into the document within a range of dates.

The text parameters shown on tabbed pages 315, 320, and 325 in FIGS. 3A, 3B, and 3C are example criteria and component characteristics that the user may choose after invoking a parameter selection routine but before invoking a spellchecking routine. In various embodiments, tabbed pages 315, 320, and 325 may be invoked in a variety of different ways. In some embodiments such tabbed pages may be invoked from a drop-down menu. In other embodiments the pages may be invoked by a control-key combination. For example, the user may press "Control-Shift-S" to display the tabbed pages.

In some embodiments, after the user chooses a combination of text filtering parameters, the user may save the combination for subsequent use. For example, the text filtering parameter choices may be saved in an "E-mail Response Preferences" page for an e-mail application. Alternatively, tabbed pages 315, 320, and 325 may be the initial screens presented to the user after the user invokes the spellchecking routine. In the latter case, the associated application may not save any of the text parameters for later use, whereupon the user may need to choose the new text filtering parameters each time the spellchecking routine is invoked.

While tabbed pages 315, 320, and 325 shown in FIGS. 3A, 3B, and 3C are depicted as text filtering parameters for performing a spellchecking operation on selective text, alternative embodiments may perform other operations on selective text. In other words, the user may choose text filtering parameters in order to print selective content. For example, the user may want to retain a printout of an e-mail response text. Other embodiments may perform other operations on the selective content, or components, according to the text filtering parameters, such as delete, cut, copy, encrypt, format, e-mail, or translate. Conversely, while tabbed pages 315, 320, and 325 shown in FIGS. 3A, 3B, and 3C illustrate text filtering parameters, different embodiments may comprise different parameters for document content filtering, other than text. For example, some embodiments may have filtering parameters for spreadsheet cells, database records, or web page elements.

Figure 4:
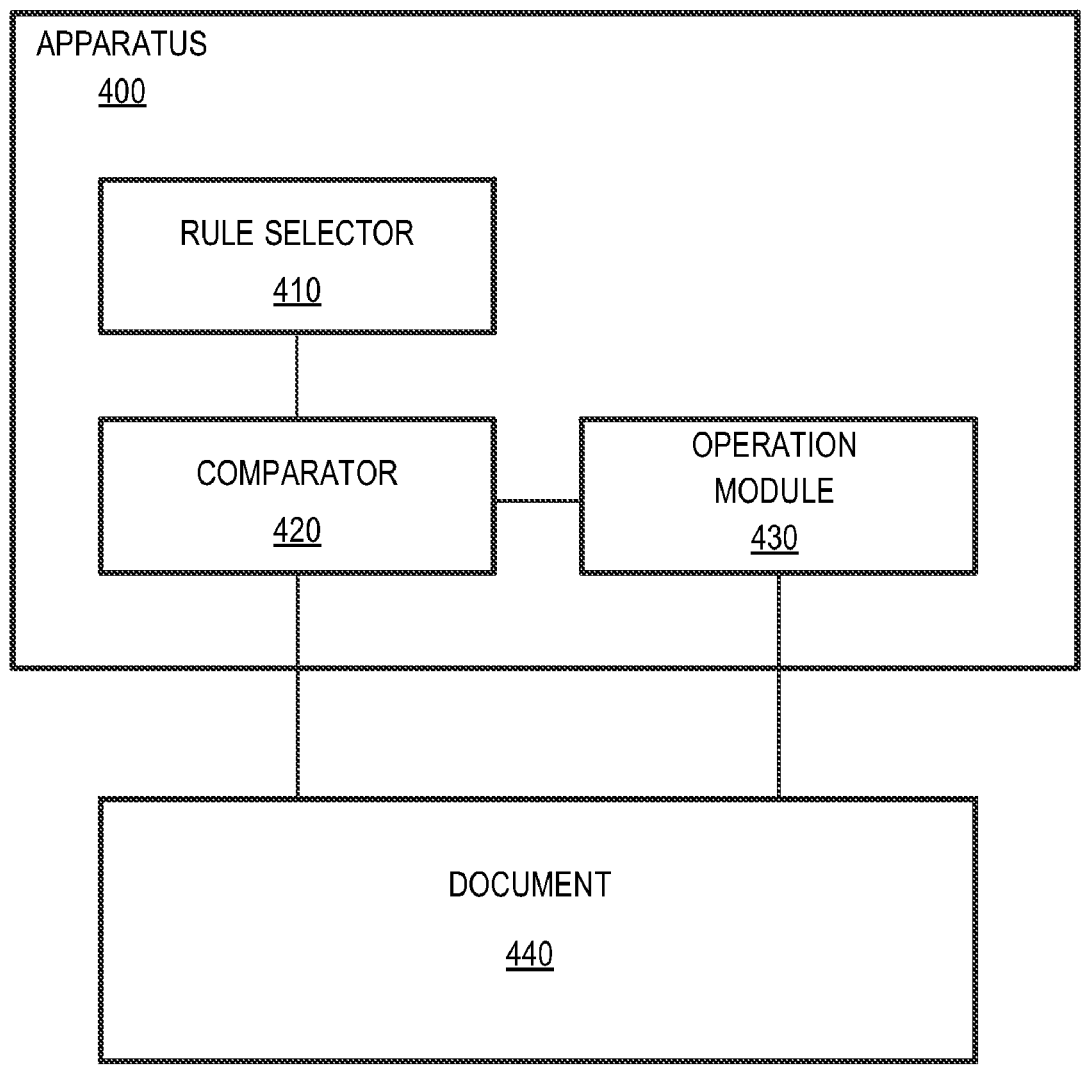
FIG. 4 depicts an apparatus employing a rule selector, a comparator, and an operation module for performing an operation on selected components in a document.

Turning now to FIG. 4, there is shown an embodiment of an apparatus 400 that may be used to select components in documents in preparation for operations on the selected components. As depicted in FIG. 4, apparatus 400 may comprise a rule selector 410, a comparator 420, and an operation module 430. The rule selector 410, the comparator 420, and the operation module 430 may all work in conjunction with each other to selectively filter out certain components of a document 440 and perform one or more operations on the filtered components.

Rule selector 410 may comprise a GUI allowing a user to select one more rules, wherein the rules may be sent to rules engine or filtering algorithm and used to filter out components in the document 440. For example, rule selector 410 may comprise a collection of checkboxes, drop-down boxes, and radio buttons communicating to the user various component characteristics, such as text formatting parameters, similar to the collection shown on tabbed page 315 in FIG. 3A. Alternatively, in other embodiments, rule selector 410 may comprise a drop-down list or pull-down menu which may be invoked by a keyboard key sequence, a mouse click, or stylus contact on a PDA screen. In even further embodiments, rule selector 410 may comprise a parameterized list stored in a file on some storage medium. The file may be periodically accessed by an application when the application performs one or more operations on selective components of the document 440. The file may be static and unalterable by the user, or the user may be able to edit the file using a file editing program.

Comparator 420 may comprise a program algorithm, subroutine, or rules engine that receives the selected filtering rules from rule selector 410 and sequentially compares one or more components of the document 440 with the rules. For one example, comparator 420 may pull in components, such as paragraphs of text, for a word processing document, such as the document 440, and search for characters and words in the paragraphs of text that have "Red" or "Underlined" formatting. As a second example, comparator 420 may pull in text blocks from an HTML document and search for components, such as characters and words, that have particular formatting, or components that are located in specific sections of the HTML document. As a third example, comparator 420 may pull in text blocks from a database document and search for components, such as fields and records, which were added to the database document on a particular date. In some embodiments comparator 420 may sequentially compare components of the document 440 against the selected rules. In other embodiments, comparator 420 may compare components of the document 440 against the rules in a different manner, such as randomly, until the entire document has been compared. After the comparison, comparator 420 may pass the filtered components, or those components matching the criteria, to operation module 430.

Operation module 430 may comprise an application algorithm or subroutine that alters or performs some operation on the filtered components transferred or passed from comparator 420. For example, operation module 430 may check the spelling of all text from the document 440 that has been underlined. In some embodiments operation module 430 may perform some initial operation, such as checking the spelling of text, and then perform a second operation such as presenting misspelled text to the user for correction. In other words, operation module 430 may perform multiple operations. Also, the types of operations that operation module 430 performs may vary widely in different embodiments. In some embodiments operation module 430 may, for example, print the filtered components. In some embodiments operation module 430 may delete, cut, or copy the filtered components. In even further embodiments, operation module 430 may encrypt, format, translate, or e-mail the filtered components. The operation or operations performed by operation module 430 may vary widely, therefore, based on the needs of the associated application.

Figure 5:
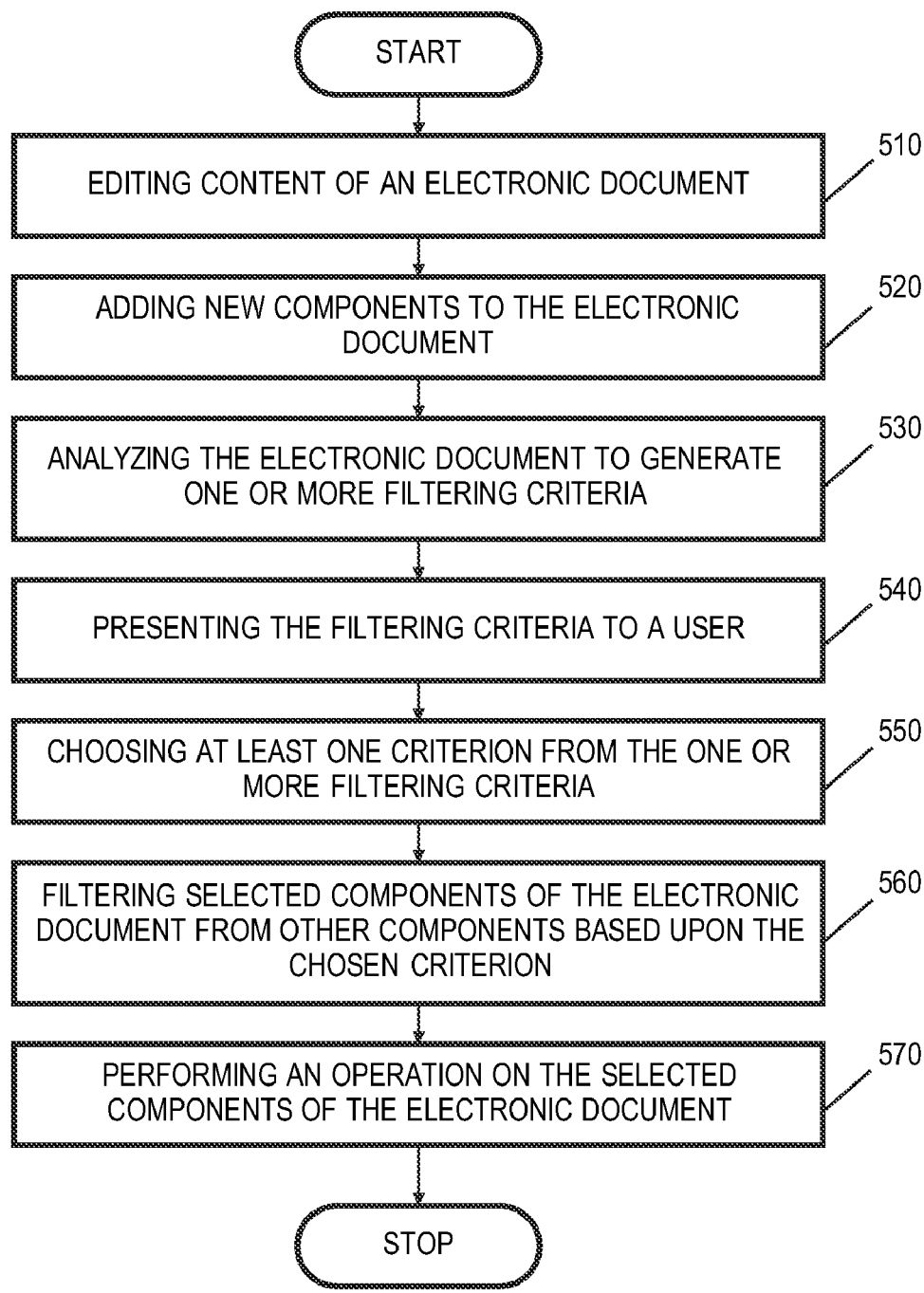
FIG. 5 depicts a flowchart of an embodiment of a method to perform an operation on filtered components of a document.

FIG. 5 depicts a flowchart 500 of an embodiment to perform an operation on selected components of an electronic document. An embodiment according to flowchart 500 begins with editing content of the electronic document (element 510). For example, a personal computer user may run a software application, such as an HTML editor, and edit an HTML document. Alternatively, the software application may be a database application accessing and editing database records for a small company or corporation.

An embodiment of flowchart 500 continues by adding new components to the electronic document (element 520). In some embodiments, adding new components may comprise adding new HTML text to the HTML document. In other embodiments, adding new components may comprise adding new database records to a database or correcting one more records that already exist in the database. In alternative embodiments, adding new components may comprise inserting text and other characters into cells of a spreadsheet.

A system according to the embodiment of FIG. 5 may proceed by analyzing the electronic document to generate filtering criteria (element 530). The application used to edit the electronic document may have a subroutine that examines the components of the electronic document and develops a list of document attributes that components in electronic document may possess. For example, a subroutine in the HTML text editor may examine the text of the HTML document being edited and develop a list of parameters, or text format criteria, used in the HTML document. If the HTML document contains red text, white text, and blue text, the subroutine may generate a list containing "red", "white", and "blue" as choices for available text format parameters. The document and component attributes may comprise these example text format parameters.

Upon analyzing the electronic document in generating the filtering criteria (element 530) an embodiment according to FIG. 5 may continue by presenting the filtering criteria to the user (element 540). Once presented with this list of filtering criteria, the user may choose at least one criterion from the filtering criteria (element 550). For example, the user may be presented a list of possible text colors to choose from a drop-down box whereupon the user may choose "red" and "white" as filtering criteria.

After the user chooses one or more of the filtering criteria, the document editing application may continue by filtering selected components of the electronic document from other components based upon the chosen criteria (element 560). For example, the HTML text editor may examine the HTML document and distinguish which text has either "red" or "white" formatting. After filtering the selected components from the other components in the electronic document based on the filtering criteria (element 560), an embodiment may continue by performing an operation on the selected components (element 570). For example, the user may desire to print all "red" and "white" text that has been entered into the HTML document and initiate a "Selective Print" command from a drop-down menu of the HTML text editor application. The HTML text editor application may select all red and white formatted text in the HTML document and send it to a local printer attached to the personal computer. An embodiment according to FIG. 5 may continue by allowing the user to continue editing the electronic document (element 510), or allowing the user to exit the document editing application.

Alternative embodiments similar to the embodiment depicted in FIG. 5 may have fewer or more elements. For example, an alternative embodiment may not comprise analyzing electronic document to generate filtering criteria (element 530). Instead, the document editing application may instead present the user with a standardized list of filtering criteria. An example standardized list may be the list of parameters shown in FIGS. 3A, 3B, and 3C. As for an example embodiment having more elements, an application may allow a user to pre-select a portion of the electronic document for analyzing, filtering, and modifying. Continuing with our example from above, the HTML document may contain six or seven pages of HTML encoded text. The HTML text editor application may allow the user to first select two middle pages from the six or seven, and then perform the analyzing (element 530), choosing (550), filtering (560), and operate on only those two pages in the middle of the HTML document.

Another embodiment of the invention is implemented as a program product for use with a system to perform an operation on an electronic document in accordance with, e.g., flowchart 500 as shown in FIG. 5. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the internet and other networks. Such data and/or signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and apparatuses for performing operations on selected, or filtered, components of an electronic document. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Further, embodiments may achieve multiple objectives but not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method of performing an operation, comprising:
    enabling a first person to select a text attribute of a document, wherein the document comprises a first section of text and a third section of text added by the first person, wherein the first and third sections comprise the text attribute, wherein further the document comprises a second section of text that has been added by a second person and separates the first and third sections;
    filtering, by the computer, the first and third sections from the second section based on the selected text attribute, wherein the text attribute comprises one of a text font, a text color, a text indentation, a text style, a text size, a text alignment, a text spacing, a text author, and a text date; and
    performing the operation on the first and third sections of text, wherein the operation comprises a spelling checker operation for checking spelling of text of the first and third sections of text, wherein performance of the operation is invoked prior to filtering the first and third sections, the filtering of the first and third sections is performed in response to invoking performance of the operation, and wherein the operation is performed in response to the filtering of the first and third sections.

2. The method of claim 1, further comprising analyzing the document for a plurality of text attributes to enable the first person to select the text attribute from the plurality of text attributes.

3. The method of claim 1, further comprising enabling the first person to select the text attribute for the first and third sections of text.

4. The method of claim 3, wherein the text attribute relates to formatting characters of text of the first and third sections for display on a graphical user interface (GUI) screen.

5. The method of claim 4, wherein performing the operation consists of encrypting text of spreadsheet cells.

6. An apparatus to filter text for an operation, the apparatus comprising:
    a rule selector to pick at least one text attribute of both a first section and a third section of a document, wherein further the first and third sections comprise text of a first person, wherein further the first and third sections are separated by a second section of text added by a second person;
    a text comparator communicably coupled with the rule selector to compare text of the three sections to the at least one text attribute and filter the first and third sections from the second section via the at least one text attribute, wherein the at least one text attribute comprises one of a text font, a text color, a text style, a text size, and a text author; and
    an operation module communicably coupled with the text comparator to perform the operation on the text of the first and third sections, wherein the operation comprises a spelling checker operation for checking spelling of text of the first and third sections of text, wherein performance of the operation is invoked prior to filtering the first and third sections, the filtering of the first and third sections is performed in response to invoking performance of the operation, and wherein the spelling check operation is performed in response to the filtering of the first and third sections.

7. The apparatus of claim 6, wherein the at least one text attribute is used to filter text of an e-mail reply document.

8. The apparatus of claim 7, wherein the rule selector comprises a graphical user interface.

9. The apparatus of claim 6, wherein the apparatus comprises a computer executing an application, wherein further the application is one of an e-mail application and a web page application.

10. A system, comprising:
    a graphical user interface (GUI) screen configured to display a first section of text and a third section of text separated by a second section of text, wherein the first and third sections comprise a first text attribute and the second section comprises a second text attribute, wherein the second text attribute comprises one of a text font, a text color, a text style, a text size, and a text author;
    memory configured to store the first, second, and third sections in a document, wherein the memory stores instructions of an application; and
    a processor operatively coupled to the memory, the processor configured to execute the instructions and perform an operation on the second section, wherein the instructions enable the operation by filtering the first and third sections from the second section based on a difference of the first and second text attributes, wherein further the operation comprises a spelling checker operation for checking spelling of text of the second section of text, wherein performance of the operation is invoked prior to filtering the first and third sections, the filtering of the first and third sections is performed in response to invoking performance of the operation, and wherein the spelling check operation is performed in response to the filtering of the first and third sections.

11. The system of claim 10, wherein the application enables a user to select the second text attribute from a plurality of text attributes.

12. The system of claim 11, wherein the application analyzes the document to generate the plurality of text attributes.

13. The system of claim 11, wherein the application enables saving the second text attribute to be used later without needing to reselect the second text attribute.

14. The system of claim 11, wherein the second text attribute consists of the text author.

15. The system of claim 14 further comprising one of checking text for spelling errors and checking text for grammatical errors.

16. A computer program product comprising a computer useable medium having a computer readable program, wherein the computer readable program when executed on a computer causes the computer to perform operations, the operations comprising:
    communicating one or more text attributes via a user interface, wherein the user interface is used to select at least one text attribute from the one or more text attributes, wherein the at least one text attribute comprises one of a text font, a text color, a text style, a text size, and a text author;
    receiving from the user interface the selected at least one text attribute;
    filtering one or more text elements of an electronic document based upon the at least one text attribute; and performing a text operation on the filtered one or more text elements, wherein the text operation comprises a spelling checker operation for checking spelling of the one or more text elements, wherein performance of the operation is invoked prior to filtering the one or more text elements, the filtering of the one or more text elements is performed in response to invoking performance of the operation, and wherein the spelling check operation is performed in response to the filtering of the one or more text elements.

17. The computer program product of claim 16, wherein the operations further comprise analyzing the electronic document to generate the one or more text attributes.

18. The computer program product of claim 17, wherein the operations further comprise presenting a list of the one or more text attributes to a user to enable the user to select the at least one text attribute.

19. The computer program product of claim 16, wherein the computer program product comprises a word processor application.

20. The computer program product of claim 16, wherein filtering one or more text elements of an electronic document comprises filtering one or more characters of an e-mail response document.

* * * * *